F. HOWE & F. BURNOR.
SPOKE FASTENER.
APPLICATION FILED MAR. 13, 1911.
1,064,909.
Patented June 17, 1913.
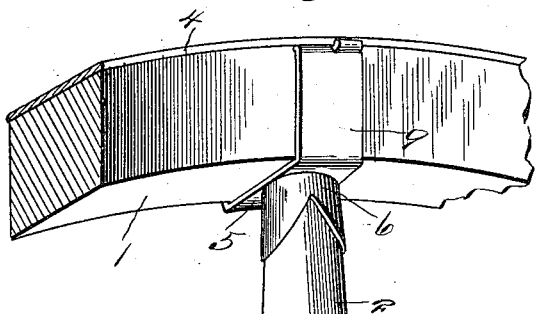
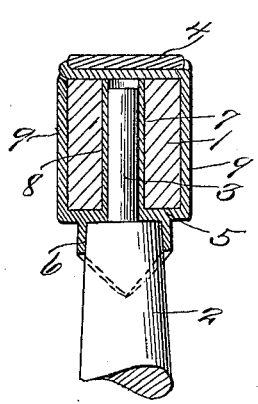 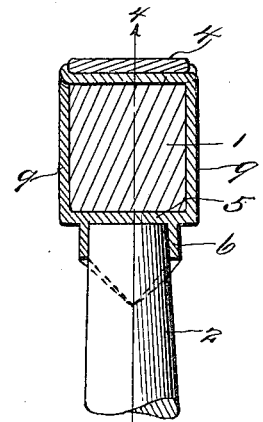
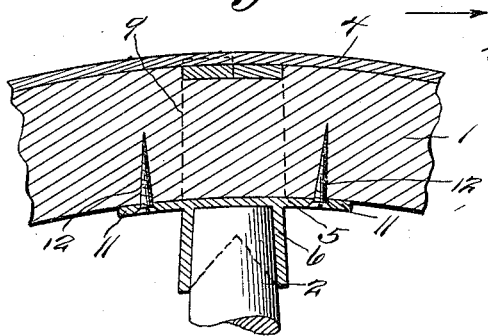
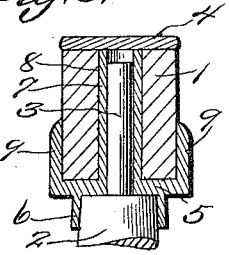
Witnesses
Inventors
F. Howe
and F. Burnor,
By D. Swift &c.
Attorney

UNITED STATES PATENT OFFICE.

FREDERICK HOWE AND FREDERICK BURNOR, OF DEERFIELD, MICHIGAN.

SPOKE-FASTENER.

1,064,909.

Specification of Letters Patent.  Patented June 17, 1913.

Application filed March 13, 1911. Serial No. 614,110.

*To all whom it may concern:*

Be it known that we, FREDERICK HOWE and FREDERICK BURNOR, citizens of the United States, residing at Deerfield, in the county of Lenawee and State of Michigan, have invented a new and useful Spoke-Fastener; and we do hereby declare the following to be a full, clear, and exact description of the invention, such as will enable others skilled in the art to which it appertains to make and use the same.

This invention relates to the art of vehicle wheels, and it more particularly pertains to a new and useful spoke fastener for such wheels.

The invention aims as its primary object to provide a device for detachably securing spokes to the felly, whether or not the spokes are provided with tenons.

A further object of the invention is to provide a device for repairing the spoke connection with the felly of old wheels.

Another object of the invention is to provide means for repairing split fellies, and also preventing fellies from splitting, said means including means for entirely embracing the felly, so as to securely hold the tire thereon.

A still further object of the invention is to provide a device of the class set forth, which is simple in construction, cheap to manufacture, and easy of application.

The invention comprises further features and combination of parts hereinafter set forth, shown in the drawings and claimed.

In the drawings: Figure 1 is a perspective view of a portion of a felly, a tire and a spoke, showing the application of the spoke fastener, constructed in accordance with the invention. Fig. 2 is a transverse sectional view of Fig. 1. Fig. 3 is a view similar to Fig. 2 showing a different form of spoke fastener for securing the spoke, in case the spoke is without a tenon, or for repairing the connection between the spoke and the felly, in case the tenon has become broken. Fig. 4 is a view taken on line 4—4 of Fig. 3. Fig. 5 is a view showing the extensions omitted between the rim and the tire.

Referring to the drawings 1 denotes a portion of the felly or rim of the wheel of a buggy, wagon or other vehicle, and 2 designates one of the spokes having a reduced portion or tenon 3. 4 designates the tire.

The improved spoke fastener comprises a face plate 5, which is provided with a socket portion 6, to receive the full sized portion of the spoke, while the extension sleeve 7 (which enters the hole 8 of the felly) receives the tenon 3 of the spoke. The lateral extensions 9 of the spoke fastener entirely embrace the felly 1, as shown in Figs. 1 and 2 so as to prevent splitting of the felly. These extensions 9 engage the tire in such wise as to prevent displacement thereof.

In Fig. 3, the extension sleeve 7 is dispensed with. In Fig. 4 however, the face plate is provided with laterally extending ears 11, at right angles to the lateral extensions 9, and through which are screws or other suitable means 12 extend, for securing the face plate to the felly.

The device as shown in Figs. 3 and 4 is for the purpose of securing spokes without tenons in place, or for repairing spokes, of which the tenons had become broken.

From the foregoing it will be noted that a novel form of spoke fastener has been devised, and one which has been found practicable and simple in construction, cheap to manufacture, and exceedingly easy to apply.

The invention having been set forth, what is claimed as new and useful is:—

1. In combination a rim, a tire, a spoke for the rim, a metallic fastener comprising a socket plate, the socket of which receives the full sized portion of the spoke, the socket plate having lateral extensions, which together with the plate surround the rim, said extensions having means to engage the opposite edges of the tire.

2. In combination a rim, a tire, a spoke for the rim, a metallic fastener comprising a socket plate, the socket of which receives the full sized portion of the spoke, the fastener having lateral extensions extending outwardly upon the sides of the rim, the rim having a recess, said extensions being reduced half in width at their end portions, said reduced portions being bent across said rim and arranged in said recess, said reduced portions terminating at their extremities in outturned lugs to engage the opposite edges of the tire.

In testimony whereof we have signed our names to this specification in the presence of two subscribing witnesses.

FREDERICK HOWE.
FREDERICK BURNOR.

Witnesses:
V. B. CANNON,
M. E. CANNON.

Copies of this patent may be obtained for five cents each, by addressing the "Commissioner of Patents, Washington, D. C."